(12) United States Patent
Jahnke

(10) Patent No.: US 11,614,175 B2
(45) Date of Patent: Mar. 28, 2023

(54) SELF-CONTAINED HYDRAULICALLY CONTROLLED RELIEF VALVE

(71) Applicant: Premium Oilfield Technologies, LLC, Houston, TX (US)

(72) Inventor: Douglas Jahnke, Hockley, TX (US)

(73) Assignee: PREMIUM OILFIELD TECHNOLOGIES, LLC, Houston, TX (US)

( * ) Notice: Subject to any disclaimer, the term of this patent is extended or adjusted under 35 U.S.C. 154(b) by 119 days.

(21) Appl. No.: 17/370,681

(22) Filed: Jul. 8, 2021

(65) Prior Publication Data
US 2023/0012138 A1 Jan. 12, 2023

(51) Int. Cl.
*F16K 17/04* (2006.01)
*F16K 37/00* (2006.01)

(52) U.S. Cl.
CPC ........ *F16K 17/042* (2013.01); *F16K 37/0008* (2013.01); *F16K 17/04* (2013.01); *Y10T 137/7734* (2015.04); *Y10T 137/7852* (2015.04)

(58) Field of Classification Search
CPC ................... Y10T 137/7734; Y10T 137/7852
USPC .................................................. 251/63, 63.5
See application file for complete search history.

(56) References Cited

U.S. PATENT DOCUMENTS

| | | | | |
|---|---|---|---|---|
| 2,142,410 A * | 1/1939 | Quick | ................... | F16L 55/055 137/514.7 |
| 4,321,945 A * | 3/1982 | Chabat-Courrede | ........................ | F16K 17/0433 137/514.7 |
| 4,335,744 A * | 6/1982 | Bey | ..................... | F16K 17/0493 251/86 |
| 4,776,562 A * | 10/1988 | Kalaskie | ................. | F17C 13/04 251/63.4 |
| 5,755,428 A * | 5/1998 | Ollivier | .................... | F16K 41/12 251/63.5 |
| 5,975,129 A * | 11/1999 | Williams | .............. | E21B 21/106 137/514.7 |
| 6,918,407 B2 * | 7/2005 | White | ..................... | F16K 17/02 137/553 |
| 2008/0078586 A1 * | 4/2008 | Tettleton | ............... | E21B 21/106 175/317 |
| 2013/0245840 A1 | 9/2013 | Lazzara | | |

* cited by examiner

*Primary Examiner* — Robert K Arundale
(74) *Attorney, Agent, or Firm* — Jackson Walker, LLP

(57) ABSTRACT

The present disclosure provides a hydraulically controlled pressure relief valve without needing a hydraulic power unit. The valve maintains the accuracy of a hydraulically controlled valve by providing a self-contained closed hydraulic system built into the pressure relief valve. For safety, the valve can be kept open to call attention to the cause of the pressure relief valve activation, yet be easily reinstated into full service without replacing expendable components such as shear pins and rupture pins. The invention offers a pressure relief valve with accuracy, cost, and ease of use.

13 Claims, 13 Drawing Sheets

SELF-CONTAINED HYDRAULICALLY CONTROLLED RELIEF VALVE

CROSS REFERENCE TO RELATED APPLICATIONS

Not applicable.

STATEMENT REGARDING FEDERALLY SPONSORED RESEARCH OR DEVELOPMENT

Not applicable.

REFERENCE TO APPENDIX

Not applicable.

BACKGROUND OF THE INVENTION

Field of the Invention

The disclosure generally relates to an apparatus and method of controlling excess pressure in systems having pressurized fluids. More specifically, the disclosure relates a hydraulically controlled pressure relief valve in a system having a pressurized fluid.

Description of the Related Art

FIG. 1 is an illustration of a typical piping system in oil field operations with a pressure relief valve installed in the system. The pressure relief valve (PRV) 4 herein is a type of safety valve used to control or limit line pressure in a system 2. Line pressure might otherwise build up in the system and create a process upset, instrument or equipment failure, or fire. The line pressure is relieved by allowing the pressurized fluid to flow through an auxiliary route, such as a PRV, out of the system. The PRV is designed or set to open at a set relief pressure to protect pressure vessels and other equipment from being subjected to line pressures that may exceed the equipment design limits. When the set relief pressure occurs, the PRV becomes the "path of least resistance" as the PRV is forced open and a portion of the fluid is diverted through the auxiliary route. In some systems flowing hydrocarbons, the diverted fluid (liquid, gas or liquid-gas mixture) is usually routed through an auxiliary piping system known as a flare header or relief header to a central, elevated gas flare where it is usually burned and the resulting combustion gases are released to the atmosphere. As the fluid is diverted, the line pressure inside the vessel will stop rising. Once the line pressure reaches the PRV's resetting pressure, the PRV is generally designed to close. A "blowdown" refers to how much the pressure needs to drop before the PRV resets and is usually stated as a percentage of set relief pressure. The blowdown can vary from roughly 2-20%, and some PRVs have adjustable blowdowns.

Several systems are currently available for activating the PRV to open. One system uses a shear pin rated to shear at a designed relief pressure. When the line pressure reaches the shear pin relief pressure, fluid forces in the PRV shear the pin and allow the PRV to open and relieve the pressure. The shear pin must be replaced to return the relief valve to service. This type of system is generally known for low accuracy.

A second system is a spring-loaded activation. The springs are biased to close the PRV. When line pressure in the PRV reaches a set relief pressure, fluid forces inside the PRV overcome the bias force of the spring and open the PRV until the pressure is relieved. Likewise, this type of system is generally known for low accuracy.

A third system is a rupture pin activation. FIG. 2 is a cross-sectional schematic of an example of a pressure relief valve in a closed position and having a rupture pin. FIG. 3 is a cross-sectional schematic of the pressure relief valve of FIG. 2 in an open position. The PRV inlet 10 is closed from relieving a line pressure through an outlet 12 when a valve piston 14 is seated to block flow through the PRV at pressures less than the rated relief pressure. When line pressure in the inlet 10 reaches the relief pressure, fluid forces cause the piston to push against the rupture pin and bend the pin to open the PRV. Like the shear pin system, the rupture pin must be replaced to return the PRV to service. This type of system is generally known for medium accuracy.

FIG. 4 is a cross-sectional schematic of a known fluid controlled spring-biased pressure relief valve. This example is from US Publication No. 2008/0078586 A1. In this example, the springs 184, 186 bias an actuator piston 174 in a retracted position, so that the valve is open. An external pressurized fluid (air or liquid) can overcome the force of the springs to close the valve until a line pressure in the PRV exceeds the force created by the external pressurized fluid on the springs and the PRV opens to relieve the excess line pressure.

FIG. 5 is a front view schematic of a typical hydraulic power unit. In practice, most systems that use fluid for actuation of a PRV use a liquid, such as hydraulic fluid, rather than air due to incompressibility of the liquid that can control more accurately the movement of the valve plug for more accurate release at the desired relief pressure. The hydraulic fluid is provided from a separate hydraulic power unit (HPU). The HPU includes a motor, pump, fluid reservoir, piping, and controls with gauges for providing the fluid to the PRV. The HPU requires initial expense, monitoring, and periodic maintenance and repair expense. It also occupies high value floor space in an often crowded piping system.

Therefore, there remains a needs for a pressure relief valve that can be relatively accurate, compact, cost-effective, and reliable.

BRIEF SUMMARY OF THE INVENTION

The present disclosure provides a hydraulically controlled pressure relief valve without needing an external hydraulic power unit. The valve maintains the accuracy of a hydraulically controlled valve by providing a self-contained closed hydraulic system built into the pressure relief valve. For safety, the valve can be kept open to call attention to the cause of the pressure relief valve activation, yet be easily reinstated into full service without replacing expendable components, such as shear pins and rupture pins. The invention offers a pressure relief valve with accuracy, cost, and ease of use.

The disclosure provides a pressure relief valve, comprising a valve body and an actuator coupled with the valve body. The valve body comprises an inlet and an outlet establishing a valve flow path; and a seat and a plug configured to engage the seat and selectively allow fluid flow through the valve flow path. The actuator comprises a primary chamber; a transverse chamber wall; a secondary chamber, where the transverse chamber wall is disposed between the primary chamber and the secondary chamber; and chamber actuator. The primary chamber comprises a primary piston sealably engaged in the primary chamber and longitudinally displaceable inside the primary chamber corresponding to a displacement of the plug relative to the seat; and a secondary stem extending longitudinally in the actuator and coupled to the plug on a first portion and coupled with the primary piston on a second portion for longitudinally displacement in association with the primary piston. The secondary chamber comprises a secondary piston sealably engaged in the secondary chamber, the secondary piston being longitudinally displaceable inside the secondary chamber; and an actuator bias element configured to bias the secondary piston toward the chamber wall. The chamber actuator is configured to selectively allow actuator fluid flow through a passageway formed between the primary chamber and the secondary chamber.

DETAILED DESCRIPTION

Figure 1:
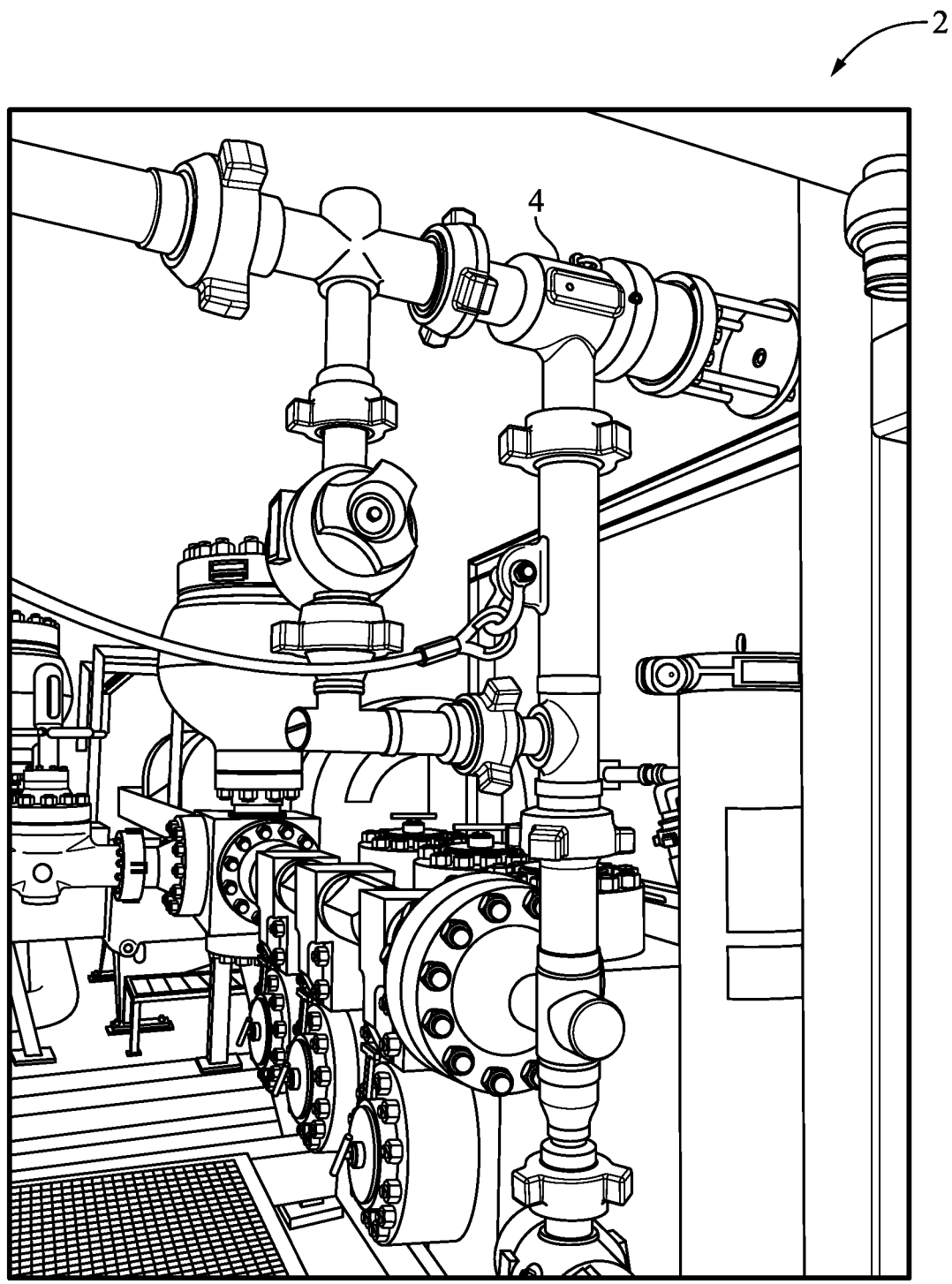
FIG. 1 is an illustration of a typical piping system in oil field operations with a pressure relief valve installed in the system.
Figure 2:
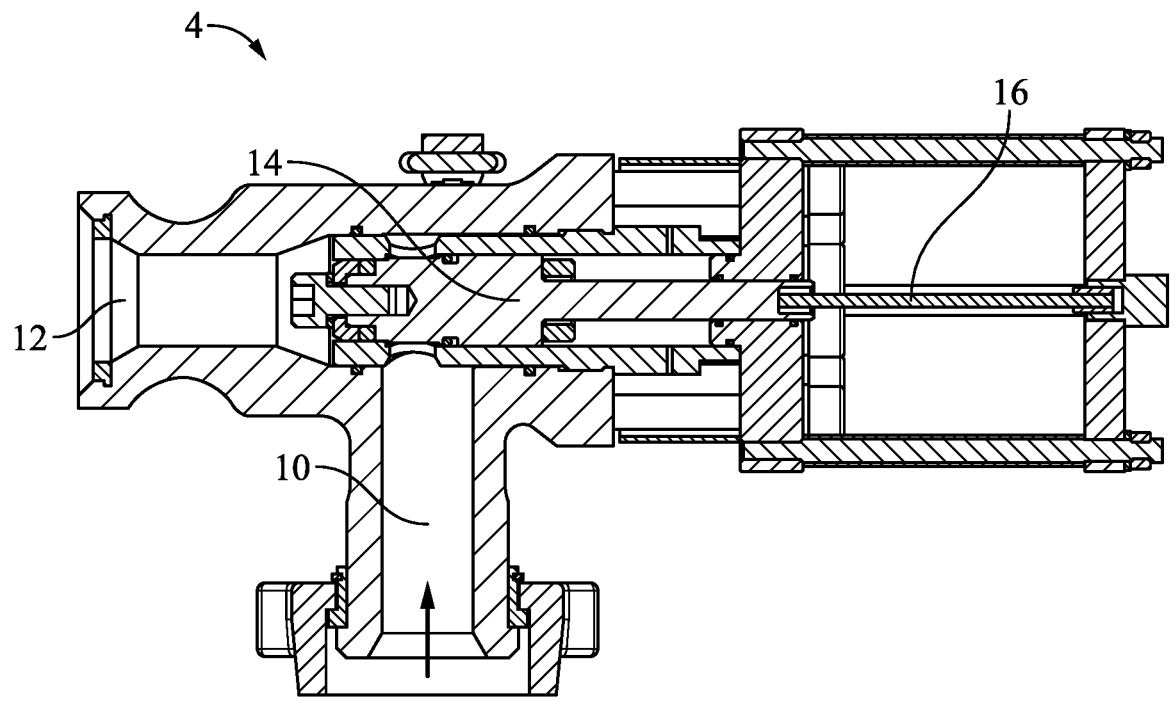
FIG. 2 is a cross-sectional schematic of an example of a rupture pin pressure relief valve in a closed position.
Figure 3:
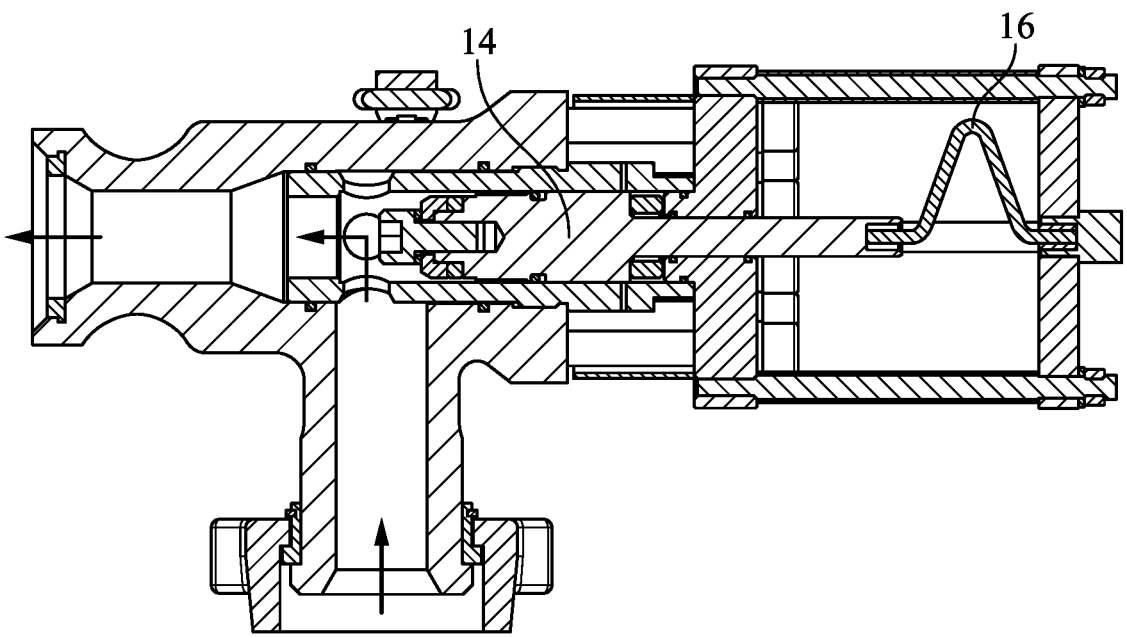
FIG. 3 is a cross-sectional schematic of the pressure relief valve of FIG. 2 in an open position.
Figure 5:
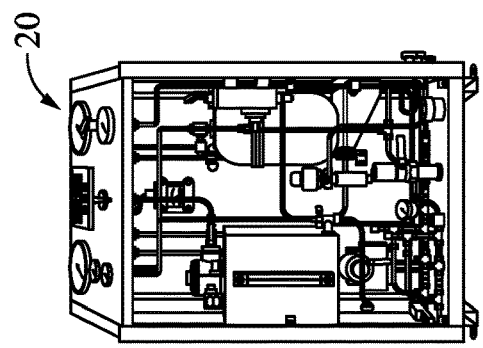
FIG. 5 is a front view schematic of a typical hydraulic power unit.
Figure 4:
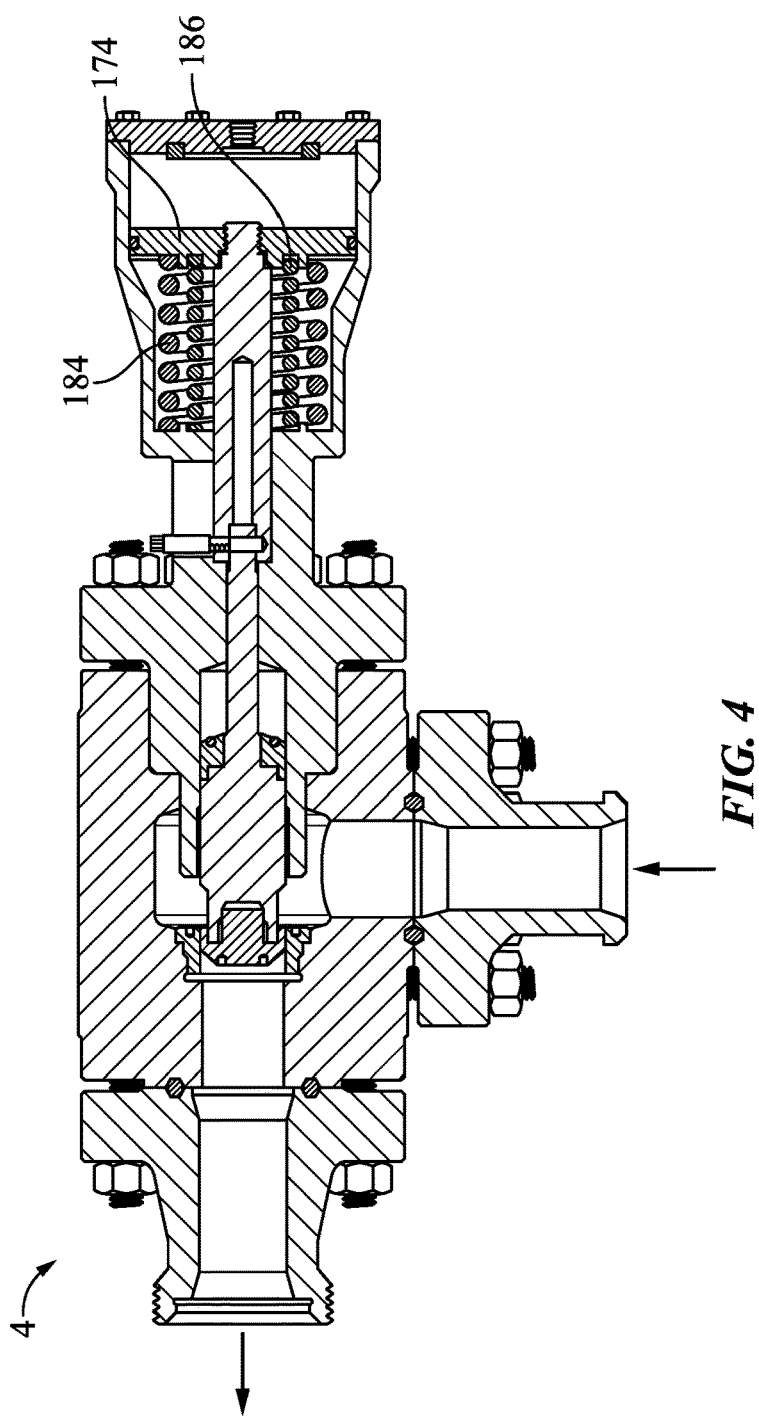
FIG. 4 is a cross-sectional schematic of a known fluid controlled spring biased pressure relief valve.

The Figures described above and the written description of specific structures and functions below are not presented to limit the scope of what Applicant has invented or the scope of the appended claims. Rather, the Figures and written description are provided to teach any person skilled in the art how to make and use the inventions for which patent protection is sought. Those skilled in the art will appreciate that not all features of a commercial embodiment of the inventions are described or shown for the sake of clarity and understanding. Persons of skill in this art will also appreciate that the development of an actual commercial embodiment incorporating aspects of the present disclosure will require numerous implementation-specific decisions to achieve the developer's ultimate goal for the commercial embodiment. Such implementation-specific decisions may include, and likely are not limited to, compliance with system-related, business-related, government-related, and other constraints, which may vary by specific implementation, location, or with time. While a developer's efforts might be complex and time-consuming in an absolute sense, such efforts would be, nevertheless, a routine undertaking for those of ordinary skill in this art having benefit of this disclosure. It must be understood that the inventions disclosed and taught herein are susceptible to numerous and various modifications and alternative forms. The use of a singular term, such as, but not limited to, "a," is not intended as limiting of the number of items. Further, the various methods and embodiments of the system can be included in combination with each other to produce variations of the disclosed methods and embodiments. Discussion of singular elements can include plural elements and vice-versa. References to at least one item may include one or more items. Also, various aspects of the embodiments could be used in conjunction with each other to accomplish the understood goals of the disclosure. Unless the context requires otherwise, the term "comprise" or variations such as "comprises" or "comprising," should be understood to imply the inclusion of at least the stated element or step or group of elements or steps or equivalents thereof, and not the exclusion of a greater numerical quantity or any other element or step or group of elements or steps or equivalents thereof. The device or system may be used in a number of directions and orientations. The terms "top", "up', "upward', "bottom", "down", "downwardly", and like directional terms are used to indicate the direction relative to the figures and their illustrated orientation and are not absolute relative to a fixed datum such as the earth in commercial use. The term "inner," "inward," "internal" or like terms refers to a direction facing toward a center portion of an assembly or component, such as longitudinal centerline of the assembly or component, and the term "outer," "outward," "external" or like terms refers to a direction facing away from the center portion of an assembly or component. The term "coupled," "coupling," "coupler," and like terms are used broadly herein and may include any method or device for securing, binding, bonding, fastening, attaching, joining, inserting therein, forming thereon or therein, communicating, or otherwise associating, for example, mechanically, magnetically, electrically, chemically, operably, directly or indirectly with intermediate elements, one or more pieces of members together and may further include without limitation integrally forming one functional member with another in a unitary fashion. The coupling may occur in any direction, including rotationally. The order of steps can occur in a variety of sequences unless otherwise specifically limited. The various steps described herein can be combined with other steps, interlineated with the stated steps, and/or split into multiple steps. Similarly, elements have been described functionally and can be embodied as separate components or can be combined into components having multiple functions. Some elements are nominated by a device name for simplicity and would be understood to include a system of related components that are known to those with ordinary skill in the art and may not be specifically described. Various examples are provided in the description and figures that perform various functions and are non-limiting in shape, size, description, but serve as illustrative structures that can be varied as would be known to one with ordinary skill in the art given the teachings contained herein. As such, the use of the term "exemplary" is the adjective form of the noun "example" and likewise refers to an illustrative structure, and not necessarily a preferred embodiment. Element numbers with suffix letters, such as "A", "B", and so forth, are to designate different elements within a group of like elements having a similar structure or function, and corresponding element numbers without the letters are to generally refer to one or more of the like elements. Any element numbers in the claims that correspond to elements disclosed in the application are illustrative and not exclusive, as several embodiments may be disclosed that use various element numbers for like elements. To assist in understanding the functions and operative relationships of the various components described in particular Figures, reference is made at times to other components in various other Figures with corresponding identifying numbers.

The present disclosure provides a hydraulically controlled pressure relief valve without needing a hydraulic power unit. The valve maintains the accuracy of a hydraulically controlled valve by providing a self-contained closed hydraulic system built into the pressure relief valve. For safety, the valve can be kept open to call attention to the cause of the pressure relief valve activation, yet be easily reinstated into full service without replacing expendable components such as shear pins and rupture pins. The invention offers a pressure relief valve with accuracy, cost, and ease of use. These attributes are important when protecting expensive capital equipment from pressure spikes, while also preventing premature system relief leading to down time.

Figure 6A:
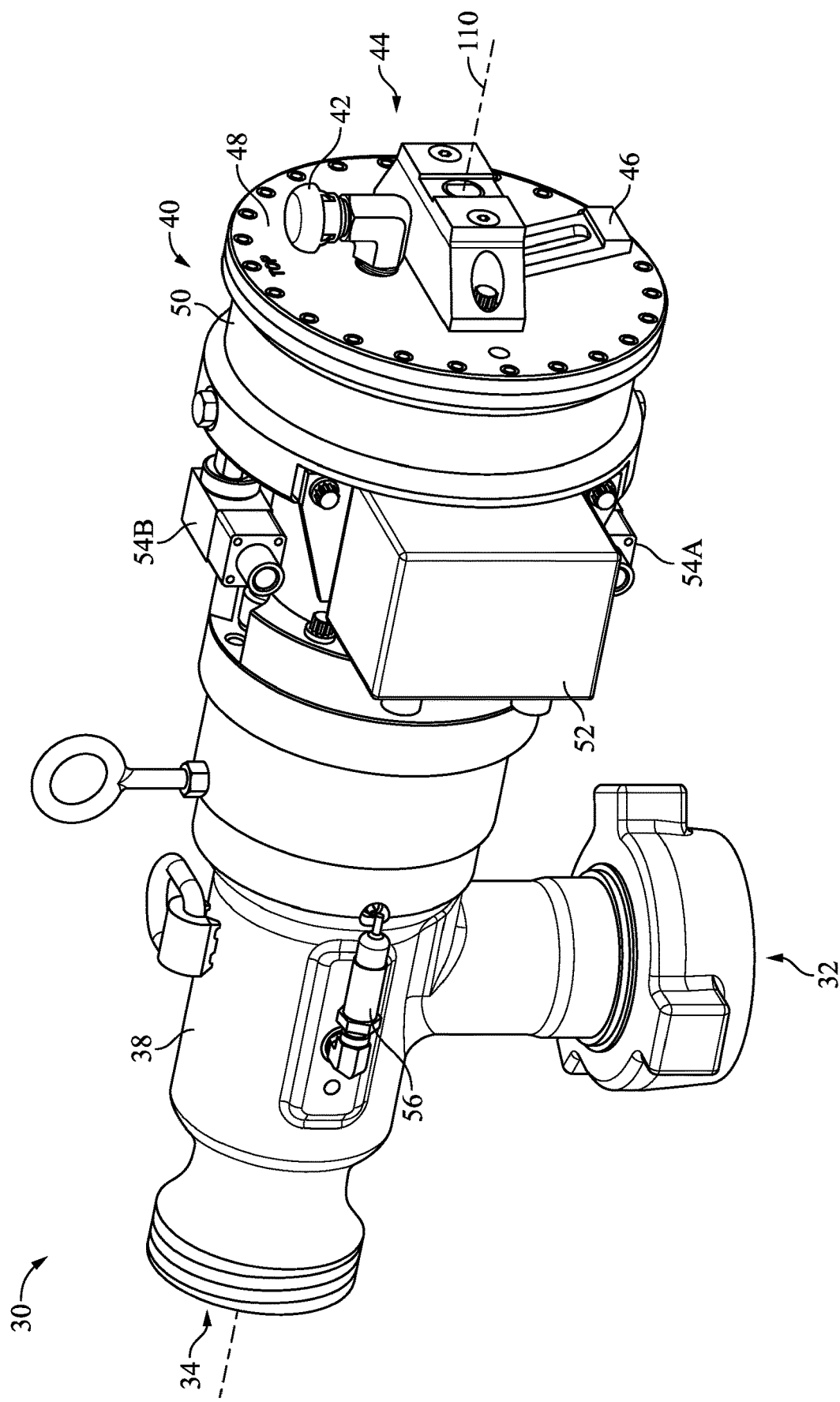
FIG. 6A is a schematic side perspective view of an exemplary pressure relief valve according to a teaching of the invention.
Figure 6B:
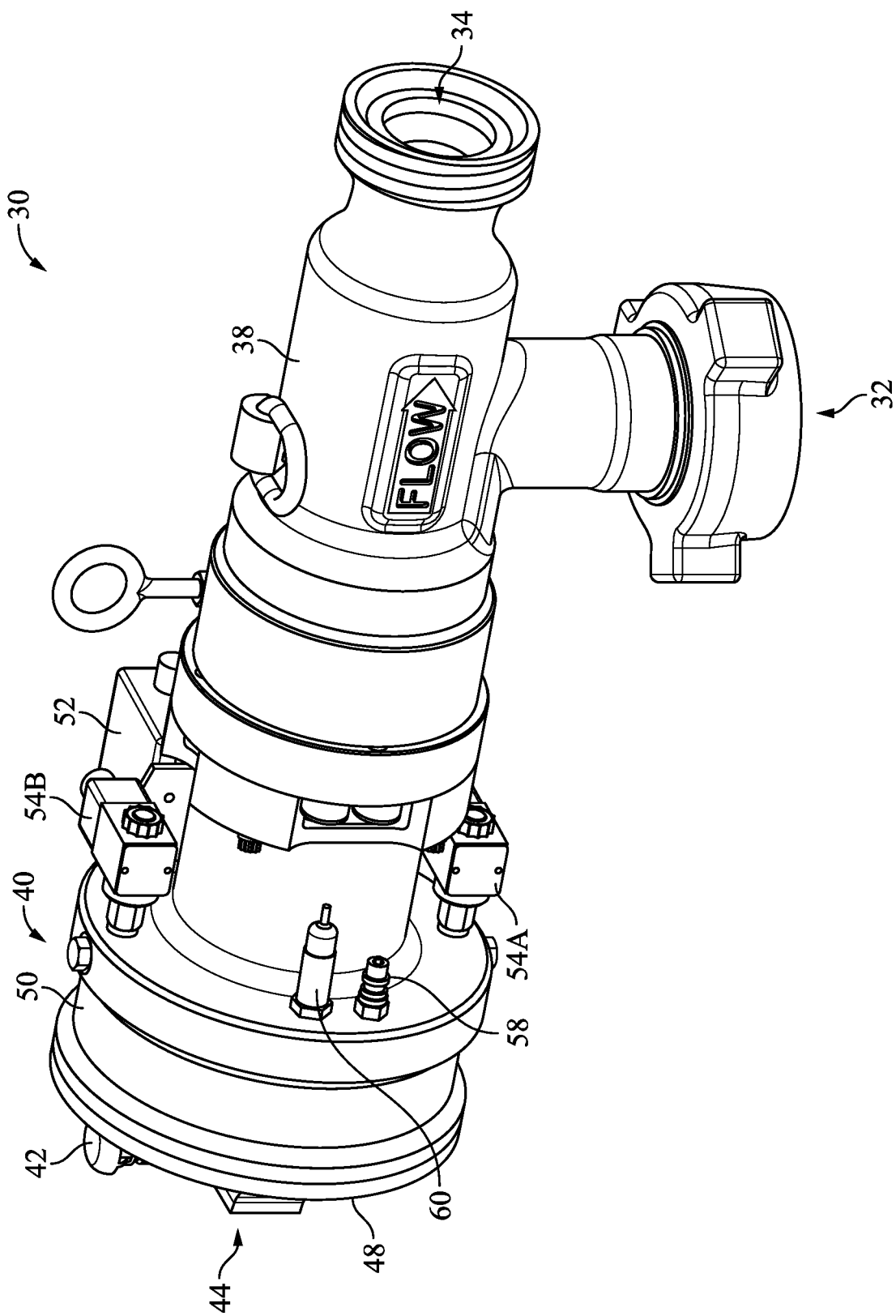
FIG. 6B is a schematic opposite side perspective view of the exemplary pressure relief valve of FIG. 6A.

FIG. 6A is a schematic side perspective view of an exemplary pressure relief valve according to a teaching of the invention. FIG. 6B is a schematic opposite side perspective view of the exemplary pressure relief valve of FIG. 6A. A pressure relief valve (PRV) 30 can include two coupled assemblies—a valve body 38 with flow components therein and an actuator 40 to control the actuation of the valve body flow components. The PRV 30 can establish a longitudinal axis 110. The valve body 38 can include an inlet 32 to receive line fluids generally in a piping system, such as shown in FIG. 1, and an outlet 34 for relieving pressure from the inlet when the line pressure in the inlet is above a set relief pressure, that is, an unacceptable pressure. A line sensor 56, such as a pressure transducer, can be used to sense line pressure in the inlet 32. Pressure transducers are generally highly accurate, so the PRV 30 is as accurate as the sensor used.

The actuator 40 is coupled with the valve body 38. The actuator 40 can include chambers and a controlled passageway therebetween, described below, that allow a volume of actuator fluid to pass between the chambers depending on whether the valve is opening or closing. Thus, the chambers can form a self-contained closed hydraulic system with a reservoir that is independent of an external actuator fluid power system, such as a hydraulic power unit or an air compressor to actuate the PRV. One aspect of the present invention is to have a high degree of accuracy in the PRV through a fluid that is considered substantially incompressible at typical line pressures, such as fluids in liquid form and often an oil, such as a commercially available hydraulic fluid. A typical PRV with hydraulic fluid requires a hydraulic power unit to keep steady hydraulic pressure on the relief valve piston. As mentioned above, the PRV of the invention can operate hydraulically without needing the hydraulic power unit.

A junction box 52 can contain wiring, circuits, controllers, and other equipment. One or more chamber actuators 54A and 54B (generally 54) can allow flow of the actuator fluid between the chambers. The chamber actuators 54 can be actuated from a signal caused by information from the line sensor 56 to relieve the excess line pressure in the inlet 32. In at least one embodiment, the chamber actuators 54 can be a solenoid valve although other types of valves can be used that open and close to allow the flow of the actuator fluid, including valves activated by hydraulic, pneumatic, electrical or other methods. As shown in the Figures, the actuator 40 can have a plurality of chamber actuators 54.

A fill port 58 can be used to add fluid to one or more of the chambers in case of leaks or general maintenance needs of the PRV 30. A low pressure sensor 60, such as a pressure transducer, can be used to detect low fluid levels in the actuator. The sensor 60 can send a signal as an alert for a low fluid level for needed maintenance. A hydraulic pump of any sort can be used to refill the actuator fluid. A vent 42 can allow internal movement of components at an ambient pressure.

The actuator 40 can also include a stem catch 44 with a release 46. In at least one embodiment, the stem catch 44 can be mounted to an end plate 48 of a chamber body 50 of the actuator. The stem catch 44 can be positioned to receive a secondary stem, described herein, passing longitudinally through the valve when the valve is opening. The stem catch 44 can restrain the secondary stem from retracting to maintain the valve in an open position until further being released by maintenance personnel. The stem catch 44 maintains an open flow path through the valve body 38 until personnel can inspect the piping system to determine the cause and take appropriate steps to avoid the overpressure situation before resetting the pressure relief valve back to normal service. While this exemplary embodiment of the stem catch is described herein, the stem catch 44 can be other mechanisms that hold the secondary stem, and the release can be manual, electric, hydraulic, pneumatic, and so forth. Thus, the exemplary embodiment of the stem catch described herein is not limiting.

Figure 7A:
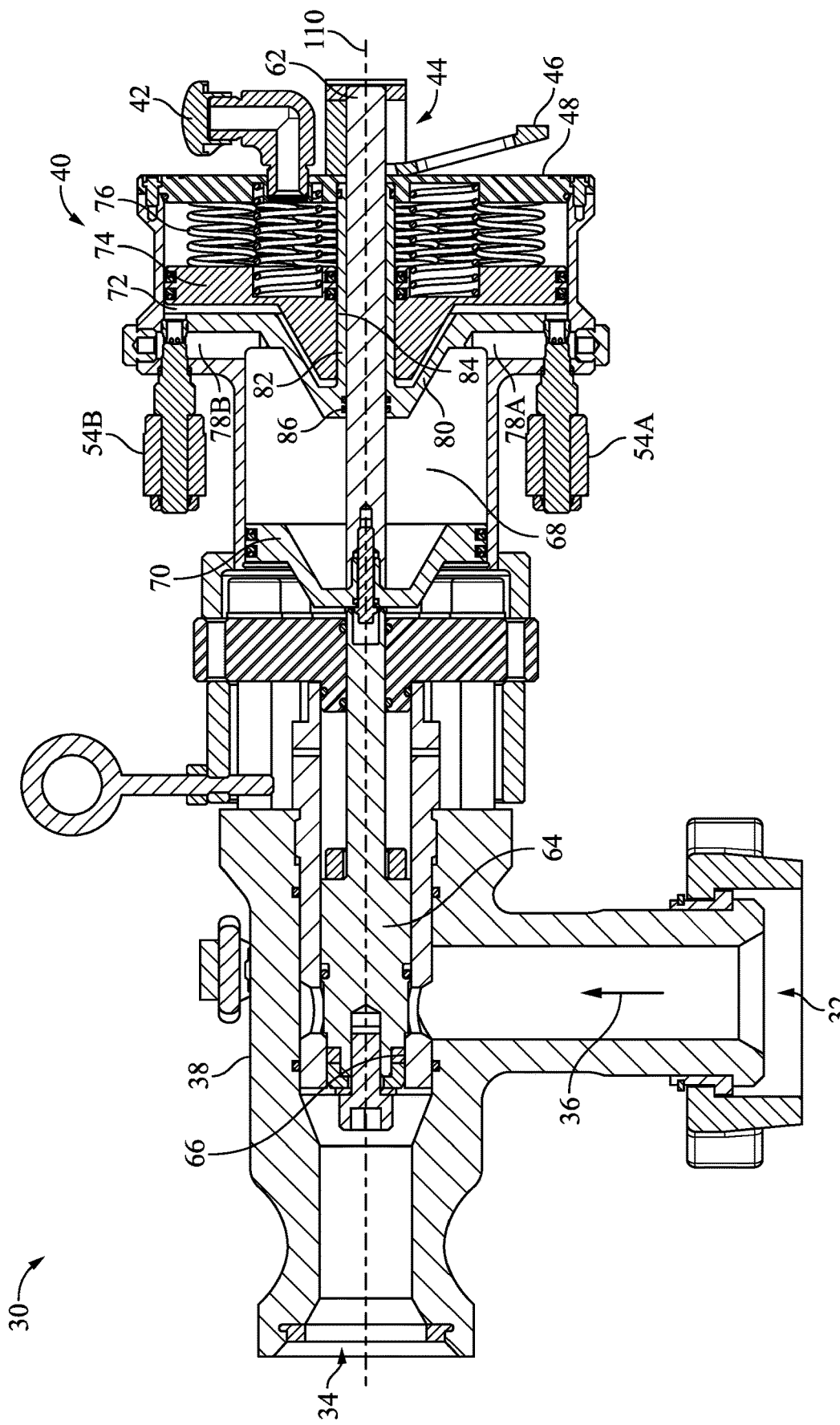
FIG. 7A is a schematic side sectional view of the pressure relief valve of FIG. 6A in a closed condition.
Figure 7B:
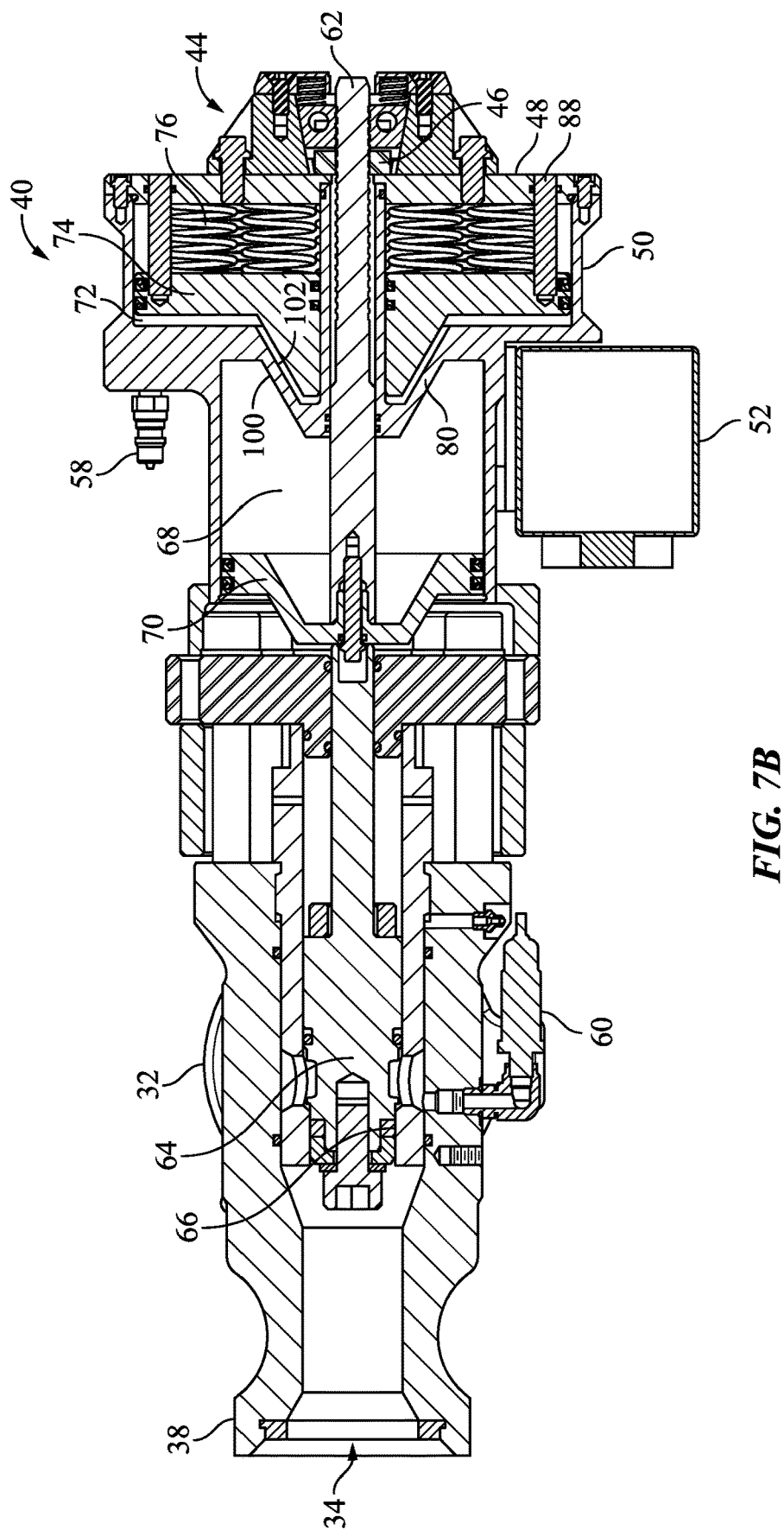
FIG. 7B is a schematic top sectional view of the pressure relief valve of FIG. 7A in a closed condition.

FIG. 7A is a schematic side sectional view of the pressure relief valve of FIG. 6A in a closed condition. FIG. 7B is a schematic top sectional view of the pressure relief valve of FIG. 7A in a closed condition. The valve body 38 with the inlet 32 and the outlet 34 forms a valve flow path 36 when the valve is open for relieving high fluid pressure in the inlet. In a closed position, a plug 64 sealingly engages a seat 66 to close the flow path 36 when the fluid pressure in the inlet is less than the set relief pressure. The plug 64 generally includes a stem portion extending longitudinally in the plug body. The plug 64 can be longitudinally displaced from the seat 66 due to fluid pressure in the inlet, as described in more detail in FIG. 8A-8B.

The actuator 40 is coupled with the valve body. The actuator 40 can include a primary chamber 68 that can contain an actuator fluid, generally an oil such as hydraulic fluid, although other fluids can be used. The primary chamber 68 includes a primary piston 70 generally sealingly engaged with an internal perimeter of the primary chamber and longitudinally displaceable in the primary chamber. The primary piston 70 can be coupled with the plug 64, such as through the stem portion of the plug. As the plug 64 is longitudinally displaced relative to the seat 66, the primary piston 70 can be longitudinally displaced in the primary chamber 68. The primary piston 70 is of a diameter that is large enough to reduce the trapped oil pressure to significantly less than the fluid pressure in the inlet. At this relatively low pressure, the fluid volume is not affected by the pressure generated from the force of the plug pushing against the primary piston when the PRV is closed. For example, the plug may exert a force on the primary piston of several thousand foot-pounds at an inlet fluid pressure of several thousand pounds per square inch, and as a result the primary piston may generate a pressure on the actuator fluid of only a few hundred pounds per square inch.

A transverse chamber wall 80 can form an end of the primary chamber 68 and separate the primary chamber from a secondary chamber 72 longitudinally displaced distally from the valve body 38 relative to the primary chamber. The secondary chamber can function as a reservoir to receive actuator fluid from the primary chamber when the PRV 30 is opening and the plug 64 is being longitudinally displaced from the seat 66, and then return the actuator fluid to the primary chamber upon the plug returning to the seat when the PRV is reset. If a portion of the actuator fluid leaks out of the primary chamber 68, the secondary chamber 72, as a reservoir, can refill the primary chamber with replacement actuator fluid. (At times, the secondary chamber may need refilling through the fill port 58, described in FIG. 6A). In at least one embodiment, the chamber wall 80 can further include a sleeve 82 extending through the secondary chamber 72. In at least one embodiment, the secondary stem 62 in the primary chamber 68 can extend longitudinally from the primary piston 70 through the transverse chamber wall 80 and through the secondary chamber 72 inside the sleeve 82 into the stem catch 44. A seal 86 disposed between the sleeve 82 and the secondary stem 62 can restrict the actuator fluid from leaking from the primary chamber 68 to the stem catch 44.

One or more passageways 78A and 78B, depending on desired flow rate and volume, can be formed between the primary chamber 68 and the secondary chamber 72 to allow actuator fluid to flow between the primary chamber and the secondary chamber when opening and closing the PRV. In at least one embodiment, the actuator fluid can flow between a portion of the primary chamber 68 between the primary piston 70 and a primary side 100 of the chamber wall 80 on one hand and a portion of the secondary chamber between the secondary piston 74 and the secondary side 102 of the chamber wall 80 on the other hand. The flow of the actuator fluid is controlled by one or more chamber actuators 54A and 54B.

The secondary chamber 72 can include a secondary piston 74 generally sealingly engaged with an internal perimeter of the secondary chamber 68 and longitudinally displaceable in the secondary chamber. A piston bore 84 formed longitudinally through a centerline of the secondary piston 74 can slide over an outer diameter of the sleeve 82. The secondary chamber 72 further includes a bias element 76 on at least one side of the secondary piston 72. In at least one embodiment, the bias element 76 is distal from the primary chamber 68 relative to the secondary piston 74 and can engage the secondary piston to exert a bias force on the secondary piston toward the primary chamber 68. An end plate 48 of the secondary chamber 72 can provide a support for the bias element to exert the bias. The bias on the secondary piston 74 can provide a relatively small residual force on the actuator fluid in the secondary chamber 72 to create a residual pressure on the actuator fluid, even when the line pressure at the inlet is below the set relief pressure and the PRV is closed. The line pressure at the inlet 32 causes a force on the plug 64 and therefore on the primary piston 70 that can cause a fluid pressure in the primary chamber 68 through a wide range of line pressures that will normally exceed the residual pressure in the secondary chamber 72 caused by the residual bias on the secondary piston 72. At a safely low line pressure in the primary chamber 68, such as when the line pressure has been relieved and thus "vented", the secondary chamber pressure may be greater than the primary chamber pressure and thus can fill any remaining void in the primary chamber 68 with actuator fluid from the secondary chamber 72.

One or more indicators 88, such as pins, can extend through one or more openings in the end plate 48 and be coupled with the secondary piston 74. The indicators can indicate the longitudinal position of the secondary piston and provide an indication of a relative amount of actuator fluid in the secondary chamber. As mentioned regarding FIG. 6B, the low pressure sensor 60 can also indicate a level of the actuator fluid via pressure.

In operation, the pressure relief valve 30 can remain closed with the plug 64 engaged with the seat 66. The plug is generally not able to be longitudinally displaced from the seat due the actuator fluid in the primary chamber not being able to flow through the passageway 78 when the chamber actuators 54 are closed. Thus, the valve can be hydraulically locked in a closed condition.

Figure 8A:
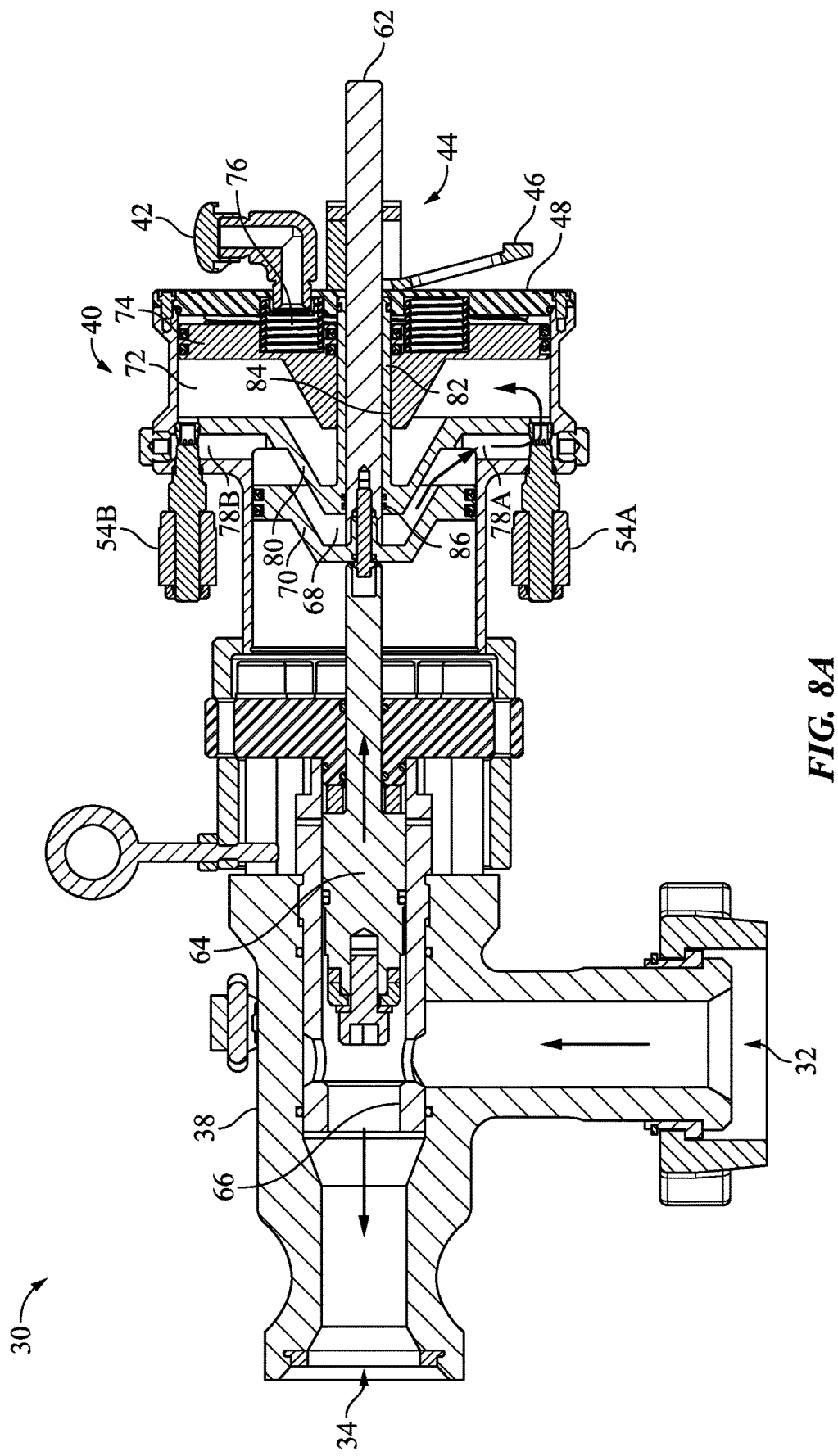
FIG. 8A is a schematic side sectional view of the pressure relief valve of FIG. 7A in an open condition.
Figure 8B:
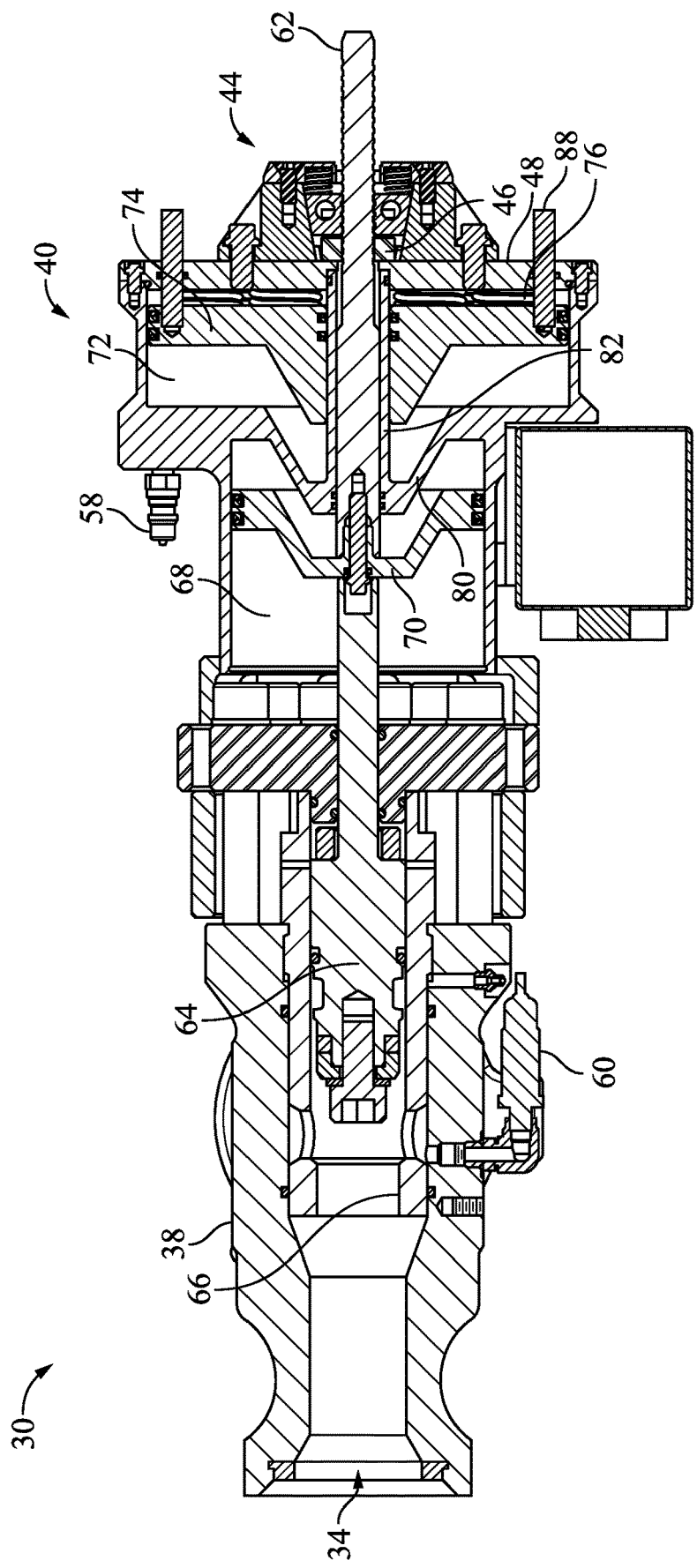
FIG. 8B is a schematic top sectional view of the pressure relief valve of FIG. 7B in an open condition.

FIG. 8A is a schematic side sectional view of the pressure relief valve of FIG. 7A in an open condition. FIG. 8B is a schematic top sectional view of the pressure relief valve of FIG. 7B in an open condition. To assist the PRV 30 to remain open to fully vent the line pressure, a stem catch 44 can be used to hold the secondary stem 62 in a longitudinal position that occurs when the plug 64 is longitudinally displaced, such as when the PRV is at least partially open. The secondary stem 62 is coupled with the primary piston 70 and ultimately to the plug 64. Therefore, the stem catch 44 does not allow the plug 64 to return to engagement with the seat 66. With the primary piston 70 fixed from the stem catch 44 holding the extended secondary stem 62 and a full primary chamber 68 between the primary piston 70 and the chamber wall 80, the biased secondary piston 74 is therefore not able to return actuator fluid back to the primary chamber 72 to start longitudinally displacing the primary piston 70, and therefore the plug 64, toward the seat 66 to start closing the PRV. The stem catch thus allows an operator or the system to control when the PRV is to be reset.

A subsystem of the PRV 30 can be used to hold open the PRV when the line pressure is relieved until the PRV is reset. In at least one embodiment, a stem catch 44 can be mounted externally to the secondary chamber 72 on the end plate 48. The stem catch 44 as a subsystem can automatically restrain the secondary stem 62 in a longitudinally displaced position when the PRV is open. The stem catch can be manually released when an operator actuates the release 46, as detailed in FIGS. 9A-9C, generally after a cause of an overpressure has been corrected.

In operation at normal line pressures, electronic controls can be used to keep the chamber actuators 54 closed that in turn traps the actuator fluid in the primary chamber 68 and stops longitudinal displacement of the plug 64 in the seat 66 to maintain the PRV in a closed condition, even with line pressure exerting forces on the plug. The line pressure sensor 56 indicates the line pressure in the inlet to the controls. If the line pressure increases to a set relief pressure, the controls can send a signal to open the chamber actuators 54 which open the passageway 78 for actuator fluid to flow from the primary chamber 68 into the secondary chamber 72. The inlet fluid pressure can act on a transverse cross section of the plug 64 that is greater than a transverse cross section of the plug that is engaged with the seat 66. The difference in square area allows the fluid pressure in the inlet 32 to longitudinally displace the plug 64 from engagement with the seat 66 to open the PRV 30 that can occur with the open passageway 78. The longitudinally displacement of the plug by the inlet fluid pressure in turn longitudinally displaces the primary piston 70 that in turn pushes actuator fluid through the passageway 78 into the secondary chamber 72 as a reservoir from the primary chamber displacement. Concurrently, the actuator fluid flowing into the secondary chamber 72 longitudinally displaces the secondary position 74 in the secondary chamber that in turn longitudinally compresses the actuator bias element 76 to build potential energy in the actuator 40 for a return stroke. The longitudinal displacement of the plug 64 with the primary piston 70 also longitudinally displaces the secondary stem 62 coupled to the primary piston. The secondary stem 62 longitudinally displaces through the sleeve 82 and into the stem catch 44. The stem catch 44 allows the secondary stem 62 to be longitudinally displaced in a direction away from the seat 66, but restricts reverse displacement toward the seat until released. Thus, the PRV 30 remains in an open condition, the plug 64 is displaced from the seat 66, the primary piston 70 has pushed actuator fluid into the secondary chamber 72, and the secondary piston 74 has been pushed into the actuator bias element 76, compressing the bias element.

The chamber actuators 54 can remain open for the actuator fluid to flow back from the secondary chamber 72 into the primary chamber 78 (or be temporarily closed and reopened when the PRV is ready to be reset). When the inlet pressure is below a certain pressure and the line pressure sensor 56 no longer signals the overpressure condition, the PRV can be ready to be reset.

In at least one embodiment, the reset timing is also dependent upon the release of the secondary stem 62 from the stem catch 44. The stem catch 44 can be released to start a return of the plug toward the seat when the PRV has relieved sufficient line pressure. Upon release, a force of the compressed actuator bias element 76 is able to longitudinally displace the secondary piston 74 to push the actuator fluid from the secondary chamber 72 through the open chamber actuators 54 and through the passageway 78 into the primary chamber 68. As the actuator fluids flows into the primary chamber 68, the actuator fluid longitudinally displaces the primary piston 70 that is coupled to the plug 64 toward the seat 66. After sufficient flow of the actuator fluid into the primary chamber 68 and sufficient longitudinal displacement of the primary piston 70 with the plug 64, the plug can reseat into the seat 66 and close the PRV 30 by closing the flow path 36. When the PRV is closed, the chamber actuators 54 can be closed to block actuator fluid again from flowing from the primary chamber 68 into the secondary chamber 72 and hydraulically lock the PRV again until a next time an excess pressure condition occurs at the inlet 32.

Figure 9A:
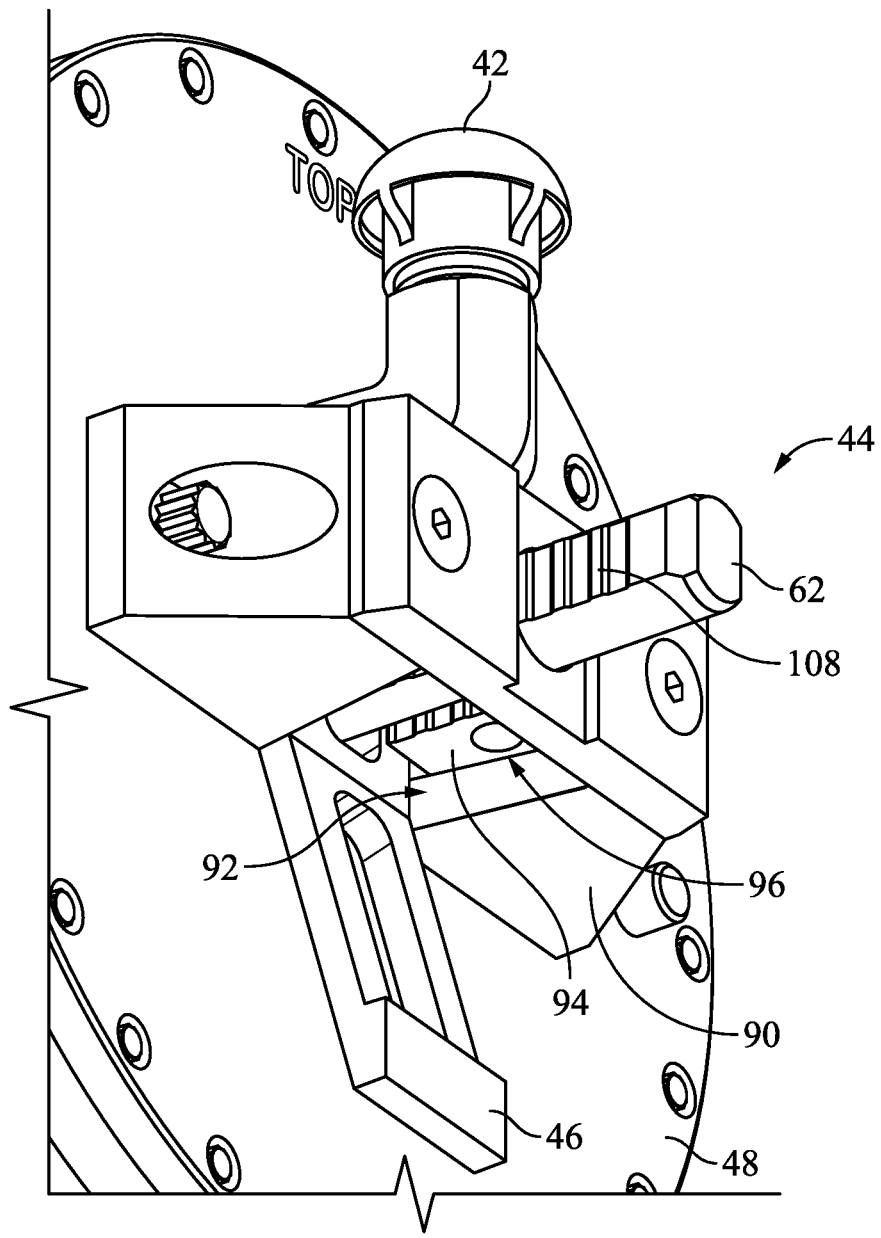
FIG. 9A is a schematic bottom perspective view of a stem catch subsystem of the pressure relief valve of FIG. 6A.
Figure 9C:
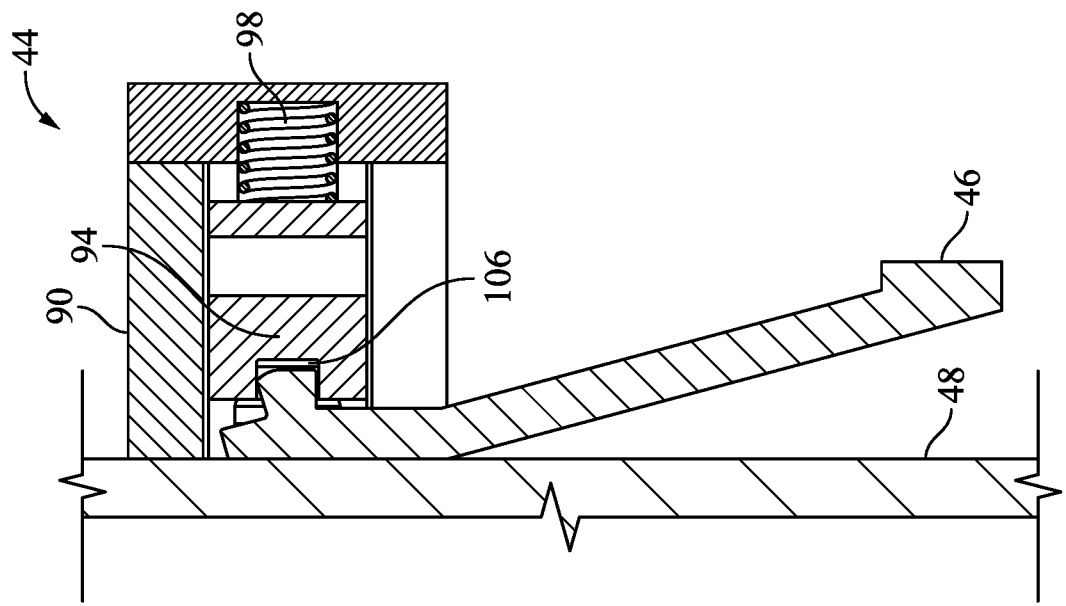
FIG. 9C is a schematic side cross-sectional view of the stem catch subsystem of FIG. 9A.
Figure 9B:
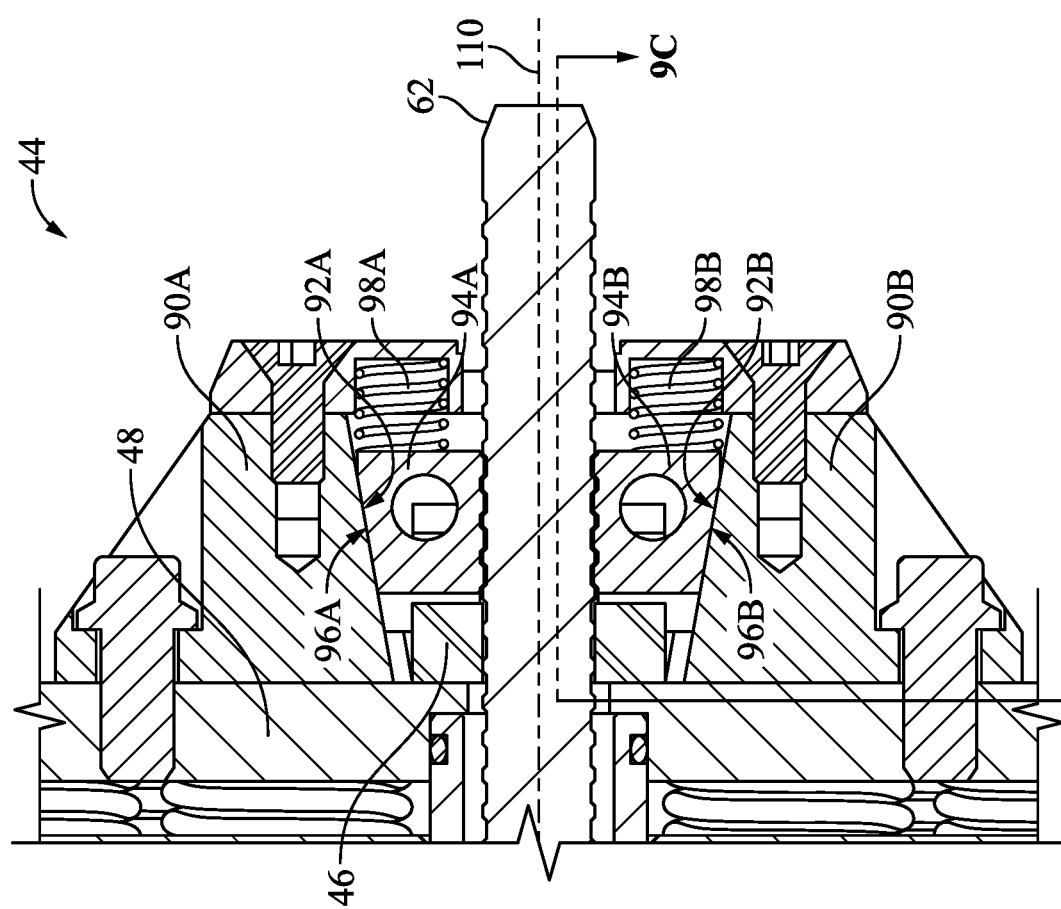
FIG. 9B is a schematic top cross-sectional view of the stem catch subsystem of FIG. 9A.

FIG. 9A is a schematic bottom perspective view of a stem catch of the pressure relief valve of FIG. 6A. FIG. 9B is a schematic top cross-sectional view of the stem catch of FIG. 9A. FIG. 9C is a schematic side cross-sectional view of the stem catch of FIG. 9A. The stem catch 44 can be any sort of mechanical, electric, magnetic, hydraulic, or pneumatic device capable of holding and releasing the secondary stem 62. The release function can be manual or by any other means as well.

In at least one exemplary embodiment, the stem catch 44 can include a plurality of fixed positioned wedge blocks, such as fixed wedge blocks 90A and 90B (generally 90), coupled to the end plate 48 of the actuator 40. A support bar 104 can be coupled to connect the fixed wedge blocks 90A and 90B. The fixed wedge blocks 90A and 90B can have tapered surfaces 92A and 92B (generally 92) that can gradually taper away from the longitudinal axis 110 (and the stem therebetween and each other) in a transverse direction (that is orthogonal to the longitudinal axis 110) as a distance away from the end plate 48 longitudinally increases. An opening in the end plate 48 can allow the secondary stem 62 to extend therethrough and into the stem catch 44. A plurality of catch wedge blocks, such as catch wedge blocks 94A and 94B (generally 94), can be positioned between the secondary stem 62 and the fixed wedge blocks 90A and 90B. The catch wedge blocks can be formed with tapered surfaces, such as tapered surfaces 96A and 96B (generally 96), and be in cooperative arrangement with the tapered surfaces 92A and 92B. The catch wedge blocks 94 can be displaced transversely between the fixed wedge blocks 90 and the secondary stem 62, based on a longitudinal position of the catch wedge blocks along the fixed wedge block tapered surfaces 92. The catch wedge blocks 94A and 94B can be biased with wedge bias elements, such as wedge bias elements 98A and 98B (generally 98). The wedge bias elements 98 can bias the catch wedge blocks 94 in a direction that can displace the catch wedge block transversely toward the secondary stem if allowed to move in the biased direction. In the embodiment shown, the biased direction would be generally in a direction toward the seat 66, that is, with a bias that is opposite a direction of extension of the secondary stem 62 as the valve is opening, such as shown by comparison of the secondary stem 62 positions in FIGS. 7A and 8A. A release 46 can be disposed toward the end plate 48 to act as a lever against the end plate. The release 46 can be rotatably and slidably coupled with the catch wedge blocks 94 in a slot 106. The secondary stem 62 can include ridges 108 to assist the catch wedge blocks in restraining the secondary stem.

In operation, when the pressure relief valve is opening, the secondary stem 62 progressively extends through the catch wedge blocks 94 that are biased toward the secondary stem by operation of the wedge bias elements 98. The expanding tapered surfaces 92 of the fixed wedge blocks 90 allows the catch wedge blocks 94 to be pushed by the secondary stem 62 along the tapered surfaces of fixed wedge blocks 90 away from the end plate 48 to create sufficient transverse clearance for the secondary stem to extend longitudinally. When the secondary stem 62 stops extending, the biased catch wedge blocks 94 can automatically slide back along the tapered surfaces 92 toward the end plate 48, thus closing the clearance and gripping the secondary stem 62.

When an operator is ready to reset the valve 30, the operator can push the release 46 that in turn displaces the catch wedge blocks 94 against the bias of the wedge bias elements 98. The resulting displacement along the tapered surface 92 of the fixed wedge blocks 90 expands a distance between the catch wedge blocks 94 and the secondary stem 62 and creates sufficient transverse clearance to allow the secondary stem 62 to be released from the catch wedge blocks and displace towards the seat 66. The secondary stem 62 displaces toward the seat 66 automatically due to actuator fluid pressure generated by the bias on the secondary piston 74 as described above.

Figure 10A:
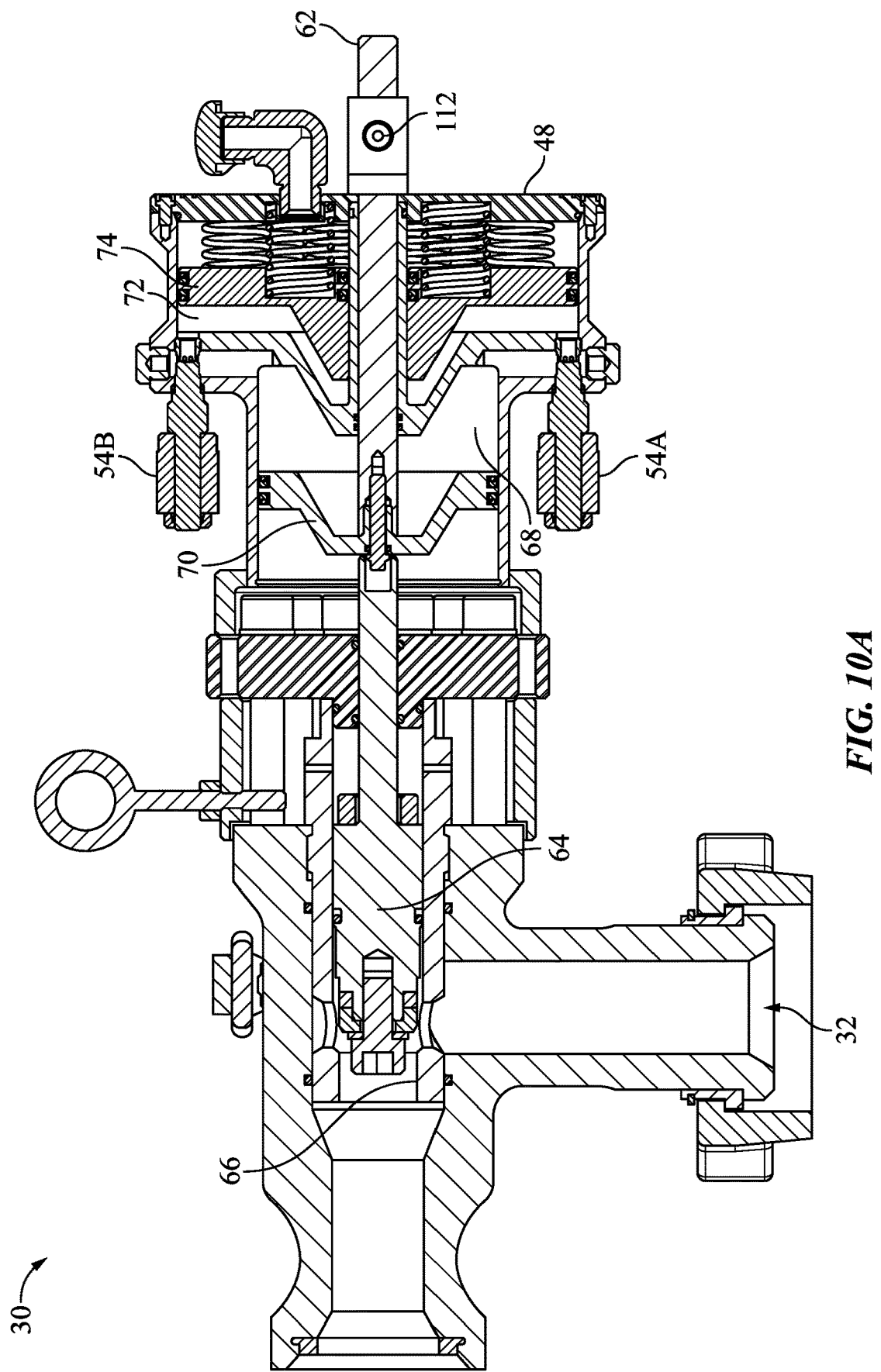
FIG. 10A is a schematic partial side cross-sectional view of the pressure relief valve with another embodiment of a subsystem to maintain the PRV in an open condition until reset.
Figure 10B:
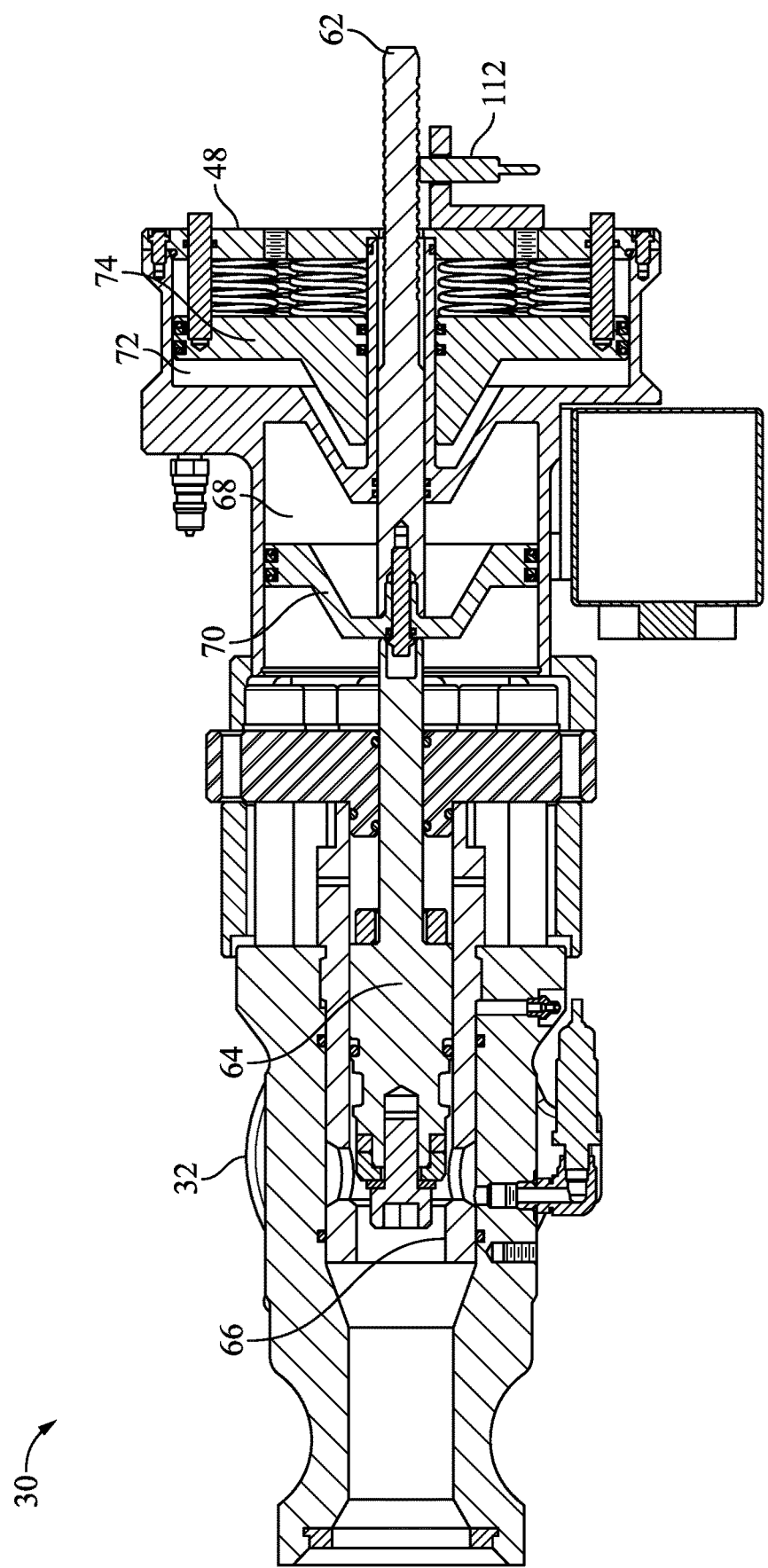
FIG. 10B is a schematic top sectional view of the pressure relief valve and subsystem of FIG. 10A.

FIG. 10A is a schematic partial side cross-sectional view of the pressure relief valve with another embodiment of a subsystem to maintain the PRV in an open condition until reset. FIG. 10B is a schematic top sectional view of the pressure relief valve and subsystem of FIG. 10A. A position sensor 112 can be located to sense a position of a component coupled to the plug 64 that at least indirectly indicates the position of the plug, such as when the plug is disengaged from the seat 66 so that the PRV 30 is open. The position sensor 112 can be various types of sensors, including a linear sensor, proximity sensor, a conductivity sensor, or other sensors. For example, the position sensor 112 can be located to sense movement of the secondary stem 62 through the end plate 48, as described above. When opening the PRV 30 and disengaging the plug 64 from the seat 66, the chamber actuators 54 (shown in FIGS. 7A and 8A) are normally open to allow actuator fluid to flow from the primary chamber 68 into the secondary chamber 72. Upon sensing an appropriate location (such as by movement) of the secondary stem 62 that indicates the relative location of the plug, the sensor 112 can provide input to a controller to close the chamber actuators 54. Upon closing the chamber actuators 54, the volume in the secondary chamber 72 becomes locked and the secondary piston 74 is restricted from pushing actuator fluid back into the primary chamber 68 to start closing the PRV. Thus, the PRV 30 can remain open until the PRV is ready for reset. To start the reset process, the chamber actuators 54 can be opened to allow the actuator fluid to flow back into the primary chamber 68 and push the plug 64 toward the seat 66 for reengagement. Other locations and other components, externally and internally, are contemplated.

Another embodiment of a subsystem to maintain the PRV in an open condition until reset to use the line pressure sensor 56 shown in FIG. 6A. The line pressure sensor 56 can provide input to a controller (and particularly a switch) on line pressure, such as at or near the inlet 32 (shown in FIG. 6A). A below normal line pressure during operation generally indicates the line pressure has been relieved, because the PRV is open. When the line pressure has been relieved, the chamber actuators 54 can be closed to keep the PRV 30 open. The PRV 30 can be kept open by restricting the actuator fluid from flowing from the secondary chamber 72 back into the primary chamber 68 by closing the chamber actuators 54. To start the reset process, the chamber actuators 54 can be opened to allow the actuator fluid to flow back into the primary chamber 68 and push the plug 64 toward the seat 66 for reengagement.

The PRV of the invention has been described for use with pressure sensors, controls, and a manual release. The PRV is not limited to these embodiments. Other equipment and methods are conceived including limit switches, relays, and direct wiring, and well as automatic resets and other systems, such as proximity and optical switches that can sense positions of components for determining actuation of various steps in the operation. Further, the actuator can be equipped with other sensors, gauges, and meters, wired and wireless communication capabilities, remote monitoring capabilities, and other features to enhance its functions. Other and further embodiments utilizing one or more aspects of the invention described above can be devised. For example, some of the components could be arranged in different locations in the PRV, and other variations that are limited only by the scope of the claims.

The invention has been described in the context of preferred and other embodiments, and not every embodiment of the invention has been described. Obvious modifications and alterations to the described embodiments are available to those of ordinary skill in the art. The disclosed and undisclosed embodiments are not intended to limit or restrict the scope or applicability of the invention conceived of by the Applicant, but rather, in conformity with the patent laws, Applicant intends to protect fully all such modifications and improvements that come within the scope of the following claims.

What is claimed is:

1. A pressure relief valve, comprising:
a valve body comprising:
an inlet and an outlet establishing a valve flow path; and
a seat; and
a plug configured to engage the seat and selectively allow fluid flow through the valve flow path; and
an actuator coupled with the valve body, comprising:
a primary chamber comprising:
a primary piston sealably engaged in the primary chamber and longitudinally displaceable inside the primary chamber corresponding to a displacement of the plug relative to the seat; and
a secondary stem extending longitudinally in the actuator and coupled to the plug on a first portion and coupled with the primary piston on a second portion for longitudinally displacement in association with the primary piston;
a transverse chamber wall;
a secondary chamber, wherein the transverse chamber wall is disposed between the primary chamber and the secondary chamber, the secondary chamber comprising:
a secondary piston sealably engaged in the secondary chamber, the secondary piston being longitudinally displaceable inside the secondary chamber; and
an actuator bias element configured to bias the secondary piston toward the chamber wall; and
a chamber actuator configured to selectively allow actuator fluid flow through a passageway formed between the primary chamber and the secondary chamber.

2. The pressure relief valve of claim 1, wherein the pressure relief valve is configured to open the chamber actuator based on the fluid pressure in the inlet at a relief pressure to allow the actuator fluid in the primary chamber to flow through the passageway into the secondary chamber.

3. The pressure relief valve of claim 2, wherein the actuator fluid flown from the primary chamber into the secondary chamber longitudinally displaces the secondary piston in a direction opposed to the bias of the actuator bias element.

4. The pressure relief valve of claim 3, wherein the pressure relief valve is configured to allow the actuator fluid in the secondary chamber to flow through the passageway into the primary chamber based on a force of the secondary piston on the actuator fluid caused by the bias of the actuator bias element.

5. The pressure relief valve of claim 1, wherein the primary chamber and secondary chamber and passageway between the chambers comprises a closed hydraulic system to control and release fluid through the pressure relief valve independent of an external actuator fluid power system.

6. The pressure relief valve of claim 1, wherein the actuator further comprises a releasable stem catch configured to releasably restrain the secondary stem as the secondary stem extends longitudinally with displacement of the primary piston.

7. The pressure relief valve of claim 6, further comprising a release for the stem catch, the release being configured to allow the secondary stem coupled with the plug to displace longitudinally toward the seat.

8. The pressure relief valve of claim 6, wherein the releasable stem catch comprises:

at least one fixed wedge block fixedly coupled to a surface on the actuator and in operational alignment with the secondary stem that extends longitudinally in the actuator, the fixed wedge block having a tapered surface that gradually tapers away from the stem in a transverse direction as a distance away from the surface longitudinally increases;

a catch wedge block can be transversely disposed during operation between the fixed wedge block and the secondary stem, the catch wedge block having a tapered surface corresponding to the fixed wedge block tapered surface, the catch wedge block being configured to displace transversely between the fixed wedge block and the secondary stem based on a longitudinal position of the catch wedge block along the fixed wedge block tapered surface; and a wedge bias element configured to apply a bias against the catch wedge block in a direction that can displace the block transversely toward the secondary stem.

9. The pressure relief valve of claim 8, wherein the catch wedge block is configured to restrain the secondary stem from displacement toward the seat.

10. The pressure relief valve of claim 8, wherein the stem catch further comprises a release for the secondary stem, the release being configured to allow the secondary stem to longitudinally displace based on the bias of the stem catch bias element.

11. The pressure relief valve of claim 10, wherein the release is coupled to the catch wedge block and is configured to displace the catch wedge block in a direction opposed to the bias from the stem catch bias element to release the secondary stem.

12. The pressure relief valve of claim 1, wherein the actuator further comprises a position sensor configured to indicate a position of the plug and signal to close the chamber actuator when the pressure relief valve is open.

13. The pressure relief valve of claim 1, wherein the actuator further comprises a pressure sensor configured to sense a fluid pressure in the valve that decreases when the valve is open and signal to close the chamber actuator when the pressure relief valve is open.

* * * * *